(12) United States Patent
Peeri

(10) Patent No.: US 7,193,767 B1
(45) Date of Patent: Mar. 20, 2007

(54) METHOD FOR ENHANCING VISIBILITY

(76) Inventor: Jonathan Peeri, 7050 Middlesbury Ridge Cir., West Hills, CA (US) 91307

( * ) Notice: Subject to any disclaimer, the term of this patent is extended or adjusted under 35 U.S.C. 154(b) by 0 days.

(21) Appl. No.: 10/791,609

(22) Filed: Mar. 3, 2004

(51) Int. Cl.
 *G02B 26/00* (2006.01)
(52) U.S. Cl. ..................................... 359/290; 359/291
(58) Field of Classification Search ............... 359/290, 359/291, 298, 604; 382/251, 252, 270–273
See application file for complete search history.

(56) References Cited

U.S. PATENT DOCUMENTS

| | | | | |
|---|---|---|---|---|
| 5,351,151 A | | 9/1994 | Levy et al. ................. 359/240 |
| 5,510,609 A | | 4/1996 | Ackerman ............... 250/201.1 |
| 5,515,456 A | * | 5/1996 | Ballard ........................ 382/252 |
| 5,550,677 A | | 8/1996 | Schofield et al. ........... 359/604 |
| 5,712,927 A | * | 1/1998 | Kim et al. ................... 382/252 |
| 5,760,902 A | | 6/1998 | Schofield et al. ........... 359/604 |
| 6,549,692 B1 | * | 4/2003 | Harel et al. ................... 385/18 |
| 6,578,974 B2 | * | 6/2003 | Helkey ....................... 359/879 |
| 6,650,460 B2 | * | 11/2003 | Kurematsu .................. 359/291 |
| 6,791,732 B2 | * | 9/2004 | Simon ........................ 359/237 |

* cited by examiner

*Primary Examiner*—Ricky Mack
*Assistant Examiner*—M. Hasan

(57) ABSTRACT

Method for automatic image enhancement to common optics in-use today at various visibility conditions by combining devices such as a Light Control Panel (32), collimating optics (30, 31), diffractive optics (45,46), reflective optics (35, 36), etc. By using devices such as the Light Control Panel the Visibility Enhancing Method provides the ability to control separately each picture element, thus enhancing the viewer's visibility.

22 Claims, 3 Drawing Sheets

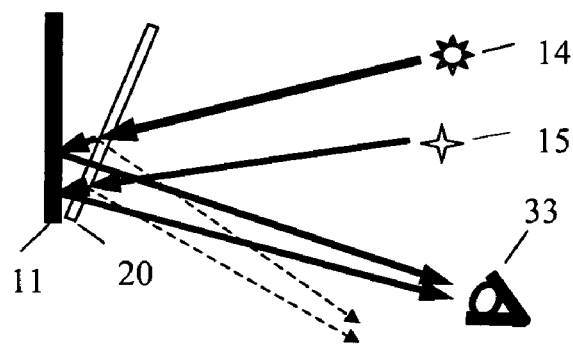
Fig. 1a --Prior Art--
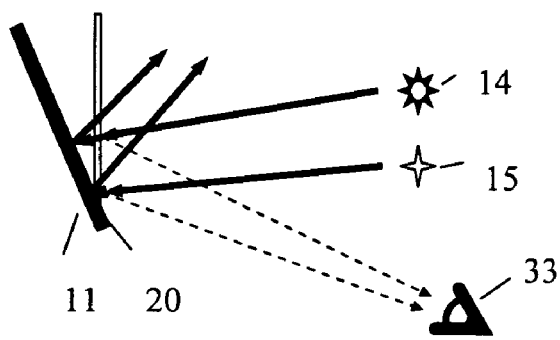
Fig. 1b --Prior Art--
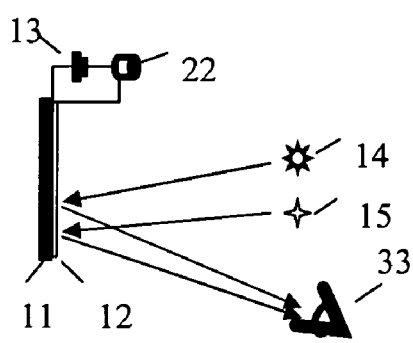
Fig. 2 --Prior Art--

METHOD FOR ENHANCING VISIBILITY

CROSS REFERENCE TO RELATED APPLICATIONS

Not applicable.

FEDERALLY SPONSORED RESEARCH OR DEVELOPMENT

Not applicable.

SEQUENCE LISTING OR COMPUTER PROGRAM LISTING

Not Applicable.

BACKGROUND

1. Field of Invention

This invention relates to visibility, specifically improving observation of darker objects when mixed with or surrounded by brighter or blinding objects.

2. Description of Prior Art

The use of direct vision devices like eyeglasses, sunglasses, mirrors, binoculars, telescopes, goggles and any type of direct view optics, is well known in the art and is used in variety of applications.

The prior art vision enhancing methods for direct view optics operates equally on the entire image (limited by the system Field Of View—FOV).

As an example we can look at the use of prior art car rearview or sideview mirror. The prior art mirror systems, active or passive, reflect the image directly or through an attenuation media. Very bright images, like those seen at night on a car's rearview mirror, can cause the driver to be temporarily blinded, and miss a significant part of the image. By tilting the mirror few degrees, as depicted in FIG. 1a, part of the light is reflected from the mirror surface rather than from the reflective surface behind the glass, thus creating a dimmed image of the entire view. Another type of car mirror has a controlled shutter/filter that changes the entire FOV transparency by electronically driving an Electro-Chromic coating (or other type of controlled transparent material). This prior art lacks the ability to dim just portions of the image (e.g. the blinding spots) and leave the rest of it unchanged.

As another example we can look at the use of prior art sunglasses or eyeglasses. In case where bright objects are surrounded by dark areas (e.g. at night) or where dimmed areas are surrounded by bright environment (during the day) the viewer suffers from blind areas and reduced visibility, due to eyesight adjusting to the average brightness (Eye Iris). The prior art controls the transparency of the glasses by a shutter/filter via an electronic ambient light sensor, which drives an Electro-Chromic coating or by using Opto-Chromic material embedded in the glass activated by the UV when in sunlight environment. Using these methods to adjust the transparency of the glasses allows the entire image to be controlled. This prior art suffers from lack of ability to dim just the blinding spots and leave the rest of image areas in the proper contrast level.

Another yet example is the Auto-dimming mirror prior art, which is using a transparency controlled medium in front of the mirror. The transparency is controlled by utilizing the electro-optic or Electro-Chromic characteristics of the material (FIG. 2). The ambient light sensor [2] located near the system, senses the light, and changes the control voltage at the battery/power source [13]. This voltage change drives the active shutter [12] to the proper transparency, such that the image reflected from the mirror [11] looks dimmed to the viewer's eye [33]. The bright spots [14] and dark areas of interest [15] are dimmed at the same magnitude which prevents blinding the viewer on one hand, but provides a darker and obscured image on the other. This prior art lacks the ability to dim just portions of the image (e.g. the blinding spots, very bright areas, etc.) and leave the darker areas in the proper contrast level.

Another prior art (U.S. Pat. No. 5,760,962 Automatic rearview mirror system using a photosensor array, Schofield, et al., Jun. 2, 1998) controls the reflectivity of the rear and a side view mirrors using a sensor array. This sensor array covers wide FOV for both mirrors. This prior art suffers from a number of disadvantages:

I) when there is blinding light from behind, the sensor array identifies the portion of the image which has a high intensity, and changes the reflectivity of the pertaining mirror segments. However, since the blinding light falls on the entire mirror, the driver will still be blinded if she moves her head, looking at the mirror from a different angle.

II) The sensor or sensors array it utilizes to measure the light intensity is separate from the mirror or attached to a small portion of it, thus requiring alignment with the mirror for proper operation. The herein proposed VEM has a light sensor attached to each light control panel element (pixel), such that only the required pixels are dimmed, without affecting the rest of the picture. Now, even if the driver moves his head he is not blinded, since the path of the light is dimmed before it actually reaches the mirror.

Another prior art Electrically Controllable Optical Filter Element (U.S. Pat. No. 5,510,609, Ackermann, Apr. 23, 1996) contains optoelectric transducer elements, electronic circuit means and a lens that is located in front of the light sensitive sensor only. The only position by which the sensor correlates with the filter elements is when the viewer is looking perpendicular to the plane of the wafer. However, in the case of a car rearview mirror, when a slanted mirror is mounted behind the filter elements, the bright light spots will not be correlated with the reflected image due to driver looking at the mirror from an angle.

Another prior art (U.S. Pat. No. 5,351,151 Optical filter using microlens arrays, Levy, et al, Sep. 27, 1994) controls the light by using arrays of small lenses and nonlinear optical materials to solve the generalized spatial and spectral optical filtering problem. This solution is segmented by using micro lenses array in such that each particular lens on one side of the array needs to align perfectly to the second array.

This prior art suffers from major disadvantage, like distorted and blurred image due to light leaks between the lenses and lack of reconstructing the segmented images into one image. In addition, the transflector materials used with homogeneous layer cause a substantial latency and delay in the response of the filter to changes in light.

OBJECTS AND ADVANTAGES

Accordingly, besides features of the controlled optics described in prior art, several objects and advantages of the present invention are:

a) To provide real time enhanced visibility for optical systems by automatically reducing the effect of strong, blinding light spots/area when viewing dark images and vise versa.

b) To provide an optical system that operates on the entire image c) To provide the ability to enhance the observed image by controlling the intensity of the different image elements.

d) The ability to keep the controlled bright element even if the observer is moving his sight position or angle.

e) The ability to add Light Controlled Panel, (LCP) to existing optical systems or arrays that generate primary or secondary images.

f) To provide a method for enhancing visibility not only for automotive use, but all kind of observation systems like telescopes, binoculars, goggles, glasses, cameras, etc.

To provide a method that can be used for devices at any frequency range in the electromagnetic spectrum.

SUMMARY OF THE INVENTION

In accordance with this invention a method for enhancing visibility at various light conditions, comprising steps like focusing the desired scenery or view (source image) on a light modulating device, processing the light of the focused image (object) by a system like a Light Controlled Panel (LCP) and projecting the enhanced image with or without magnification to the observer eyes.

BRIEF DESCRIPTION OF THE DRAWINGS

Drawing Figures
FIG. 1a—Prior Art Car Rearview Mirror —Normal Position
FIG. 1b—Prior Art Car Rearview Mirror—Flipped position
FIG. 2—Prior Art Active Rearview Mirror
FIG. 3—Light Controlled Panel (LCP)
FIG. 4—Innovated Visibility Enhancing Device (VED)
FIG. 5a—Method For Enhancing Visibility Implementation for Car Mirror—Direct Light Control
FIG. 5b—Method For Enhancing Visibility Implementation for Car Mirror—Retro Light Control
FIG. 6—Method For Enhancing Visibility implementation on Glasses

REFERENCE NUMERALS IN DRAWINGS

11—Mirror
12—Electronic Shutter
13—Battery
14—Bright Spot
15—Dark Area
16—Embedded Battery and Electronics
17—Dimmed Spot
18—Row Electrode Bus
19—Capacitor
20—Column Electrode Bus
21—Transparent Conductor (Coated Glass)
22—Light Sensor
23—Visibility Enhancing Device (VED)
24—Matrix array of transparent electrodes on surface of semiconductor chip
25—Matrix of Transparent Electrodes
26—Light Sensitive Element (LSE)
27—Transparent. Pixel Electrode
28—Transparency Control Material
30—Collimating Optical array1
31—Collimating Optical array2
32—Light Controlled Panel (LCP)
33—Observer
34—LCP Control
35—Angled Mirrors
36—Tilted Mirror
37—Enhanced Light Control System
41—Glasses Temple
42—Glasses Frame
43—Contrast Control Knob
44—Rotating Optical Array
45—Diffractive Collimating Optics 1
46—Diffractive Collimating Optics 2

DETAILED DESCRIPTION OF THE INVENTION

Figure 3:
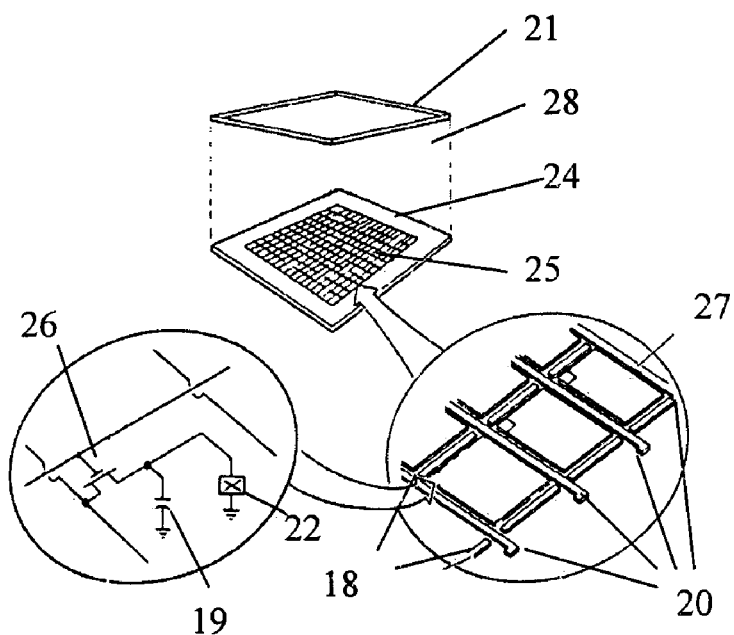

The Method for Enhancing Visibility offers automatic image enhancement to common optics in-use today at various visibility conditions. By using devices such as the Light Controlled Panel (LCP), the Method for Enhancing Visibility provides the ability to control separately some or all observed element, while keeping the other elements almost intact. In the Method for Enhancing Visibility, a Light Controlled Panel (LCP) 32 is used to generate an active pixilated panel (FIG. 3).

The Light Controlled Panel (LCP) process the observed image elements and an optical array collimates the image elements and optically directs them to the LCP's focal plane. The image is transferred through the LCP (creating a sub-image) and via the complementary collimating optical array towards the observer eyes or to another optical system. Typically the optical power (magnification) of the system is one. The same collimating optics used for the complementary optics can be used to compensate for geometric distortion.

The LCP consists of pixilated array with a Thin Film (TF) light sensitive device for each pixel. Each pixel's transparency is controlled by the amount of light that shines on it. The panel can be made of transparency-controlled material 28, comprised of transparent pixel electrodes 27, controlled by embedded TFT Light Sensitive Elements (LSE). The transparency of all the elements (Contrast) can be controlled by the magnitude of the voltage that drives the LCP. The TF active element is attached to each Pixel (structure element) to precisely control it. The row and column electrodes used to control the pixels can be formed on the same substrate as the TF array. The DC driving signal is usually applied to the row (X) electrode of the pixel, and the contrast signal is applied to its column (Y).

A verity of technologies, such as the following, may be used to implement transmissive LCP:
Dichroic Liquid Crystal (LC),
STN—LC (controls a polarized light by two additional polarizing films attached to the outer surface of the device)
Suspended Particle Device (SPD) using the same construction as illustrated in FIG. 3 but uses SPD for transparency controlled material [28].
Electrochromic material or coating The LCP 32 can be used in various pixel shapes, resolution and size to provide the desired optical system and required image quality. The driving voltage applied to the LCP controls its enhancement level and can also completely switch off the enhancement option of the LCP. Typically, when no power is applied to the LCP, the transparency of the panel is set to "Normally Open" state, in order to set the system to a neutral position (maximum transparency) as a fallback.

For some applications a reflective LCP may be used. In these applications the reflected light is controlled by the pixels by its associated LSE. For such panels a modified DLP™ Micro Mirror array manufactured by Raytheon Inc. may be used by implementing the LSE on each pixel during the device manufacturing process.

Figure 4:
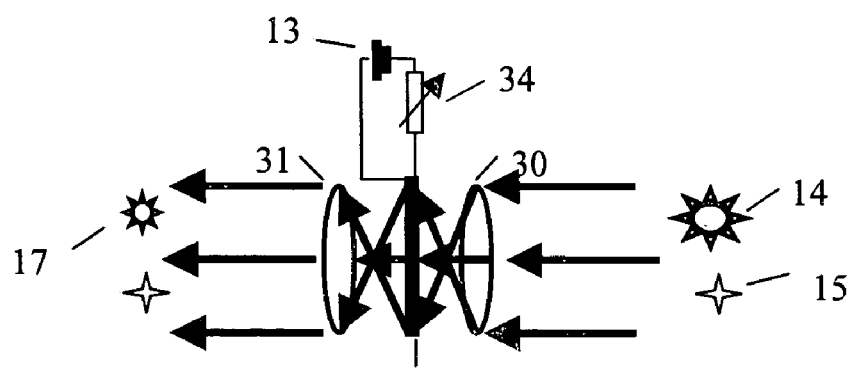

An example of a device based on the Method for Enhancing Visibility is illustrated in FIG. 4. The observed scenery comprised of incident light 14, 15 is collimated by the Optical Array1 30 and produces an imaginary image on the LCP 32 surface. This image passes through the device that attenuates the bright elements. The image is then collimates back by the Complimentary Collimated Optical Array2 31 towards the observer's eye. The enhanced image, which is rotated 180 degrees, can be rotated back if desired by any related optics, mirror or fiber optic twister.

The LCP may be used as image inhancer or other existing equipment For example, the device can be used as an add-on to a camera, and the created an enhanced photographic image which can be rotated back during the printing process.

The Method for Enhancing Visibility can be also implemented on various types of optical devices, like car rear or side mirror, enhanced optical goggles, camera lens, spectacles, eyeglasses, sunglasses, glare-shield, window, or any enhancing optical device or protection devices like LASER or arc welding goggles.

Figure 5A:
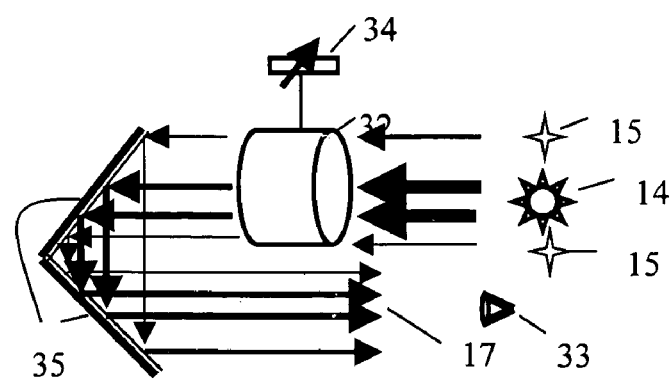

As an example, a car mirror based on the Method for Enhancing Visibility is described in FIG. 5a. The Light Controlled Panel 32 creates an image on a prism or slanted mirrors 35 towards the observer eyes 33. As stated before, the bright image elements of the observed scenery pass through the Enhanced active optical array, and are dimmed by the LCP while the other elements pass undisturbed (or with minor attenuation) to the viewer. The image contrast is controlled automatically, or manually by the LCP drive 34.

Figure 5B:
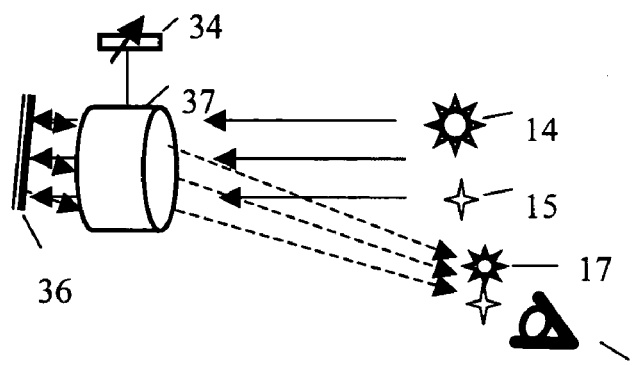

Another example for a car mirror is a retro-optical array that may be implemented as illustrated in FIG. 5b. In this example the light passes through an optical system comprising a Collimating Optical Array1 30 and a reflective LCP 32 that control the light intensity, and reflects it to the observer. The reflective LCP may be constructed of reflective pixel elements within the LCP or of a reflecting surface attached to a transparent LCP.

Figure 6:
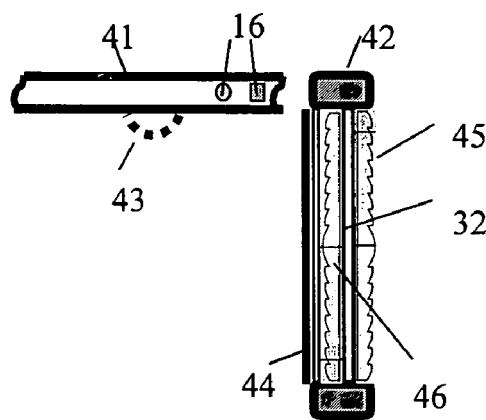

As an another example of the Method for Enhancing Visibility, the Visibility Enhancing Glasses, depicted in FIG. 6 can be used. Linear optics, binary optics, holographic optics, diffractive optics, or any surface implemented optics may comprise the optical array that can be installed on standard glasses. The glasses visibility enhancing optical array is comprised of collimating diffractive Optical Film Array 1 45 and produces an imaginary image on the LCP 32. The image passes through the LCP which attenuates the bright elements, and is collimated back by the complimentary collimating diffractive Optical Film Array 2 46. The image is then rotated by a film diffractive array 44 towards the observer 33.

For resolving implementation difficulties associated with the Optical Film Array, products like Lenticular Lens or Microlens Technology can be used. For resolving implementation difficulties associated with the LCP, a variety of reflected image sources and technologies is available through Flat Panel Display (FPD) vendors. As one of the options, the same process that is being used for producing micro-displays and flat panel displays can be used to make the LCP with the exceptions that the black mask is not required and the TFT (Thin Film Transistor), which controls the optical array, is deposited such that it becomes light sensitive element (LSE). Transperent devices like LCD (R-LCD), STN-LCD produced by companies such as SONY Co, Tokyo, JAPAN. SHARP Co, Osaka JAPAN, and Reflective devices like Liquid Crystal on Silicon (LCoS) devices produced by companies such as Displaytech, Longmont, Colo., USA, MicroPix of Dalgety Bay, Scotland UK and Three-Five Systems, Tempe, Ariz. USA, can be used.

CONCLUSION

Accordingly, the reader will see that the Method for Enhancing Visibility of this invention has a unique ability to control the brightness of image elements and improve visibility, especially in light conditions where dimming the entire image should be avoided. The Method for Enhancing Visibility can be implemented on almost any optical device. In addition, the same approach which is used for the human vision spectrum may be used for other light spectra (Near IR, IR, and LASER) where the optical elements and LCP are optimized to that spectrum.

The invented Method for Enhancing Visibility can be used in optical systems like conventional vision optics with a direct view, optical arrays like those used in cameras, and more.

Although the description above contains many specifities, these should not be construed as limiting the scope of the invention but as merely providing illustrations of some of the presently preferred embodiments of this invention. For example, different types of optics can be used for collimating the light, the Light Controlled Panel may have different shapes, the reflecting mirror can be mounted at various angles to the LCP, etc.

Thus the scope of the invention should be also determined by the appended claims and their legal equivalents, rather than only by the examples given.

I claim:

1. A method for Enhancing the Visibility of images, comprising:
   a) Focusing an image upon a plurality of pixels;
   b) for each pixel of said plurality of pixels, determining the intensity of the light that falls upon the pixel; and
   c) adjusting each pixel's effect on light as a function of the intensity determination corresponding to that pixel, wherein each pixel's effect on light is controlled by the pixel's own embedded light sensitive element.

2. The method of claim 1, wherein the image is focused using an optical array comprised of optical devices.

3. The method of claim 1, wherein the image can be of any frequency range in the spectrum.

4. The method of claim 1, wherein the embedded light sensitive element comprises a transistor.

5. The method of claim 1, wherein the light falling upon said plurality of pixels is reprocessed using an optical array.

6. The method of claim 1, wherein the image is collimated and manipulated such that the enhanced image appears to have originated from the observed scenery.

7. The method of claim 1, wherein the image is collimated and manipulated such that the enhanced image is magnified.

8. The method of claim 1 where the same devices used for focusing the observed scenery are used for directing and collimating the said enhanced image.

9. The method of claim 1, wherein each pixel is controlled by adjusting the pixel's translucency.

10. The method of claim 1, wherein each pixel is controlled by adjusting the pixel's reflectivity.

11. The method of claim 1, wherein each pixel is controlled by adjusting the pixel's light polarization.

12. The method of claim 1, wherein each pixel is controlled by adjusting the pixel's light rotation.

13. The method of claim 1, wherein each pixel is controlled by adjusting the pixel's light direction.

14. The method of claim 1, wherein each pixel is controlled by adjusting the pixel's light phase shift.

15. A light controlled panel comprising:
a plurality of pixels:
for each pixel of said plurality of pixels, means for determining the intensity of light that falls upon the individual pixel; and
means for adjusting each pixel's effect on light as a function of the intensity determination corresponding to that pixel, wherein said means for adjusting each pixel's effect on light comprises a plurality of control devices.

16. The light controlled panel of claim 15, wherein each pixel is controlled by adjusting the pixel's translucency.

17. The light controlled panel of claim 15, wherein each pixel is controlled by adjusting the pixel's reflectivity.

18. The light controlled panel of claim 15, wherein each pixel is controlled by adjusting the pixel's light polarization.

19. The light controlled panel of claim 15, wherein each pixel is controlled by adjusting the pixel's light rotation.

20. The light controlled panel of claim 15, wherein each pixel is controlled by adjusting the pixel's light direction.

21. The light controlled panel of claim 15, wherein each pixel is controlled by adjusting the pixel's light phase shift.

22. The light controlled panel of claim 15, wherein each pixel has a corresponding control device.

* * * * *